United States Patent
Berger et al.

(10) Patent No.: US 6,360,032 B1
(45) Date of Patent: Mar. 19, 2002

(54) TWO BEAM OPTICAL SWITCH AND ATTENUATOR AND METHOD OF USE

(76) Inventors: John G. Berger, 1532 Branston St., St. Paul, MN (US) 55108; David J. Emmons, 670 Windemere Curve, Plymouth, MN (US) 55441

(*) Notice: Subject to any disclaimer, the term of this patent is extended or adjusted under 35 U.S.C. 154(b) by 0 days.

(21) Appl. No.: 09/507,520

(22) Filed: Feb. 18, 2000

(51) Int. Cl.[7] .................. G02B 6/26; G02B 6/36
(52) U.S. Cl. .................. 385/16; 385/20; 385/24; 385/140
(58) Field of Search .................. 385/16–26, 140

(56) References Cited

U.S. PATENT DOCUMENTS

| | | | |
|---|---|---|---|
| 3,800,388 A | 4/1974 | Börner et al. | 29/200 |
| 4,146,856 A | 3/1979 | Jaeschke | 335/151 |
| 4,220,396 A | 9/1980 | Antell | 350/96.15 |
| 4,223,978 A | 9/1980 | Kummer et al. | 350/96.2 |
| 4,229,068 A | 10/1980 | Hodge et al. | 350/96.2 |
| 4,239,331 A | 12/1980 | Aoyama | 350/96.2 |
| 4,239,333 A | 12/1980 | Dakss et al. | 350/96.21 |
| 4,245,885 A | 1/1981 | Hodge | 350/96.2 |
| 4,378,144 A | 3/1983 | Duck et al. | 350/96.18 |
| 4,401,365 A | 8/1983 | Mizokawa et al. | 350/96.2 |
| 4,512,036 A | 4/1985 | Laor | 455/612 |
| 4,543,663 A | 9/1985 | Laor | 455/600 |
| 4,580,292 A | 4/1986 | Laor | 455/607 |
| 4,607,910 A | 8/1986 | Thurenius | 350/96.2 |
| 4,634,239 A | 1/1987 | Buhrer | 350/486 |
| 4,651,343 A | 3/1987 | Laor | 455/600 |
| 4,657,339 A | 4/1987 | Fick | 350/96.2 |
| 4,705,348 A | 11/1987 | Matsunaga et al. | 350/96.15 |
| 4,753,501 A | 6/1988 | Battle | 350/96.2 |
| 4,759,597 A | 7/1988 | Lemonde | 350/96.2 |
| 4,854,660 A | 8/1989 | Gutterman et al. | 350/96.18 |
| 4,886,335 A | 12/1989 | Yanagawa et al. | 350/96.2 |
| 4,896,935 A | 1/1990 | Lee | 350/96.2 |
| 4,911,520 A | 3/1990 | Lee | 350/96.2 |
| 4,946,247 A | 8/1990 | Muska et al. | 350/96.2 |
| 4,948,223 A | 8/1990 | Anderson et al. | 350/96.2 |
| 4,953,932 A | 9/1990 | Mihich | 350/96.15 |
| 4,989,946 A | 2/1991 | Williams et al. | 350/96.2 |
| 5,004,318 A | 4/1991 | Ohashi | 350/96.2 |
| 5,024,500 A | 6/1991 | Stanley et al. | 350/96.16 |
| 5,031,994 A | 7/1991 | Emmons | 350/96.2 |
| 5,033,813 A | 7/1991 | Westfall | 350/96.2 |
| 5,078,514 A | 1/1992 | Valette et al. | 385/20 |
| 5,098,207 A | 3/1992 | Blomgren | 385/16 |
| 5,127,084 A | 6/1992 | Takahashi | 385/140 |
| 5,179,602 A | 1/1993 | Norcross, Jr. | 385/19 |
| 5,201,016 A | 4/1993 | Jinbo et al. | 385/19 |
| 5,239,599 A | 8/1993 | Harman | 385/16 |
| 5,317,659 A | 5/1994 | Lee | 385/22 |
| 5,420,946 A | 5/1995 | Tsai | 385/22 |
| 5,434,936 A | 7/1995 | Nagaoka et al. | 385/22 |
| 5,436,986 A | 7/1995 | Tsai | 385/16 |
| 5,438,638 A | 8/1995 | Anderson | 385/16 |
| 6,173,106 B1 * | 1/2001 | DeBoynton et al. | 385/140 |

* cited by examiner

*Primary Examiner*—Hemang Sanghavi
(74) *Attorney, Agent, or Firm*—Westman, Champlin & Kelly, P.A.

(57) ABSTRACT

An optical switch and attenuator in which any waveguide in an input waveguide bundle may be selectively optically aligned or misaligned with any waveguide in an output waveguide bundle. The waveguide bundles are attached to beams that translate the bundles through non-parallel arcs. The device provides high-performance switching and attenuation of any number of input and output waveguides.

30 Claims, 11 Drawing Sheets

TWO BEAM OPTICAL SWITCH AND ATTENUATOR AND METHOD OF USE

BACKGROUND OF THE INVENTION

This invention relates generally to optical devices, and more particularly, to an optical switch for selectively aligning or misaligning the optical signal of any one of several input optical waveguides with any one of several output optical waveguides. The invention is in the field of blocking optical switching and optical attenuating devices.

Numerous optical switches have been developed for selectively switching an optical signal from one waveguide across an interface to another waveguide. Regardless of design, insertion loss and reflectance remain central to judging the optical performance of a switch. These parameters combine to describe the efficiency with which the switch passes light. The relative insertion loss and the reflectance performance of an optical switch are determined by physical elements of the switch design.

Insertion loss is a measure of how much light the switch blocks between the input and output waveguides. Higher insertion loss means more light is blocked by the switch. An ideal switch has minimal insertion loss. The insertion loss of an optical switch is determined primarily by the ability of the switch to precisely align the input waveguide with respect to the output waveguide. Offsets in longitudinal, angular, and transverse alignment must all be controlled to minimize insertion loss. Historically, transverse offset has been the most difficult source of insertion loss to control in mechanical optical switch designs.

Reflectance is the ratio of reflected light power to incident light power in an optical waveguide. Fresnel reflections at the discontinuity between the input and output waveguides are the prime source of reflectance in an optical switch. Higher reflectance adversely affects performance of an optical system in two ways. First, transmitted optical power is decreased as more light is reflected. Second, the reflected light is often transmitted back to the laser source. There it creates a proportional amount of noise on the signal. Several methods are available to reduce the reflectance such as index matching mediums, anti-reflective coatings and providing an angled endface on the waveguides. The angled endface gives the best reflectance performance.

Existing optical switches can be categorized by their mode of operation as either electronic or mechanical switches. Electronic switches have no moving parts and divert light with electrical or acoustic energy. Mechanical switches physically move optical elements to perform the switching function.

Many prior art mechanical optical switches exist for comparison to the present invention of a two-beam optical switch. Discussion of the prior art is based on two relevant physical characteristics, degrees of freedom and adjustability. Degrees of freedom refers to the number of kinematic degrees of freedom available for positioning waveguides. Adjustability describes the available motion control within each degree of freedom. A switch with adjustability can attain and hold several intermediate positions within each degree of freedom.

Most available mechanical optical switches offer a single degree of freedom. Many of these are rotary designs wherein the waveguides on both input and output sides of the switch are coaxially supported for rotation relative to each other around a single axis of rotation. U.S. Pat. Nos. 5,317,659 to Lee (1994), 5,420,946 to Tsai (1995), and 4,378,144 to Duck et al. (1983) are all similar designs with both adjustability and one degree of freedom. The Duck et al. patent describes a widely used optical switch that is representative of the other rotary designs, and displays many inherent disadvantages of the rotary designs.

This prior art rotary devices arrange output optical fibers in a circle. The input fiber is placed on an arm that is attached to an actuator such as a stepper motor. A beam expander lens is attached to each input and output fiber. The input fiber actuator is coaxial with the circle defined by the output fiber lenses. The input fiber lens faces the output fiber lenses. The actuator rotates to align the input fiber lens to any of the output fiber lenses. Adjustability is provided by the use of a stepper motor to actuate the arm.

Several single degree of freedom switches also exist that are not rotary designs. They depend on beams or arms to move the light signal between fibers. U.S. Pat. No. 5,078,514 to Valette (1992) and U.S. Pat. No. 5,024,500 to Stanley (1991) both offer one degree of freedom and adjustability. Both show a single switched fiber mounted along the length of a beam. When the beam is actuated, it bends to align the single fiber with any of the remaining fibers mounted to the base.

Non adjustable single degree of freedom mechanical switches are shown in U.S. Pat. No. 4,946,247, to Muska et al. (1990), U.S. Pat. No. 5,239,599 to Harman (1993) and U.S. Pat. No. 4,146,856 to Jaeschke (1979).

Several two degree of freedom mechanical switches do not offer adjustability. Adjustability is often removed to reduce switch size for design applications that require a limited number of fibers, such as the device shown in U.S. Pat. No. 4,220,396 to Antell (1980).

The best optical performance is delivered by optical switches with two degrees of freedom and adjustability. U.S. Pat. No. 4,886,335 to Yanagawa (1989) and U.S. Pat. No. 5,438,638 to Anderson (1995) both offer optical switches with two degrees of freedom with adjustability. The Yanagawa patent combines two linear stages to form a very large and complex optical switch. The Anderson switch is smaller and has two degrees of freedom with full adjustability available for positioning fibers.

However, the Anderson '638 patent has disadvantages.

The input and output fiber endfaces of the Anderson switch cannot be angled to incorporate the preferred angled endface to improve reflectance performance. The ferrules that hold fibers in Anderson must rotate up to 180 degrees to couple a fiber pair and this could move the endface angles as much as 180 degrees out of phase, causing a mismatch and thus insertion losses.

The Anderson design also has a limited fiber capacity. As the fiber count increases, more fibers are added to each bundle thereby increasing the bundle radius. The angular resolution required to position the outermost fibers decreases as the bundle radius increases. The result is a steady degradation in the repeatability of insertion loss and an increase in the switching time for each pairing as capacity increases.

The Anderson design will exhibit drift and signal interruption from wear. Each switching cycle generates a high degree of relative motion between the ferrules and their V-grooves. This motion creates particles that can interrupt the signal. It also wears the ferrules down steadily decreasing their diameter and creating signal drift.

The Anderson design requires a lengthy fiber search process. Since there are two locations for each possible waveguide pairings and no simple way to predict the location of the one pairing given that of the other pairing, the algorithm used may waste time finding both pairings. Also, the search process can require human intervention to achieve optimization.

The Anderson patent construction is such that fibers near the center of the input bundle will not be able to couple to fibers near the center in the output bundle. The result is that the innermost fibers in both bundles go unused and, thus, their signal-carrying capacity is wasted.

The two-beam optical switch of the present invention overcomes difficulties described above and affords other features and advantages heretofore not available.

SUMMARY OF THE INVENTION

The present invention is an optical switching device consisting of two main waveguide mounting beams or arms. The first beam includes one or more input waveguides and the second beam includes one or more output waveguides. The waveguides preferably are arranged in bundles. The beams are arranged such that the waveguide bundles carried by the respective beams face each other and each beam has a separate axis of rotation. The switch is capable of switching any of the input waveguides to align with any of the output waveguides. Waveguide interconnections are accomplished by moving the beams to adjust the location of waveguides carried by each beam to bring the desired input and output waveguide pair into close optical alignment. The driving motion for each beam is deamplified to provide the precision needed to accomplish accurate alignment, or misalignment if attenuation of the signal is desired. An optimum position is determined for all possible coupling waveguide pairs. These positions are specific to each individual switch and are pre-programmed into a device memory forming part of a switch control at the time of manufacture.

In operation, the adjustability of the present device can also be used to purposefully misalign any selected waveguide pair so as to attenuate the switched signal. Alternatively, the switch can be constructed without adjustability for applications that require limited switched waveguide capacity. In the non adjustable configuration, preferably electromagnetic actuators are used to drive the beams between two adjustable end stops, or the beams may be spring loaded against one stop.

The present invention displays excellent positioning resolution. In one aspect of the invention the beams are pivoted at a point and carry the waveguides at a location spaced from the pivot. Movement of the beams is actuated with commonly available stepper motors and reduction gear drives in the adjustable configuration. In both adjustable and non adjustable forms, motion of the beam is preferably actuated at a point on each beam so that the distance from the actuation point to the pivot point is greater than the distance from the pivot point to the waveguide endface. Because motion is larger at the actuation point, the error margin for setting the end stops or locating the optimal fiber alignment position is increased over other designs, and transverse offset errors are reduced.

Since the driving motion is de-amplified, the effects of wear at the driving motor and gear interface are reduced by the same ratio, resulting in long switch life. Wear that occurs at the rotational pins or end stops is minimal because so little relative motion is required to actuate the switch. The potential for signal interruption due to wear particles is thus reduced with this design. The distance between the wear point and the waveguide endfaces is large and there is no index matching medium to carry particles to the fiber endfaces. As a result, wear that does occur during operation does not impact optical performance. Finally, since the waveguide endfaces are not in contact during operation, there is no remaining source of wear particles near the waveguide endfaces to disrupt the optical signal.

In its adjustable configuration, the switch of the present invention is able to actively compensate for wear. Two of the input waveguides are attached to a light source and two of the output waveguides are attached to a light detector. The input and output waveguides used are located at diagonally opposite corners of their respective waveguide matrices. The drive algorithm makes use of these waveguides to establish a zero or home position for each beam. All other waveguide locations are referenced to these home positions. The same routine is used to periodically realign the matrix and compensate the device for any wear that may have occurred. This is done by re-optimizing each of the opposing locations at power-up or whenever desired.

The present invention has a lower cost, both in material and manufacturing. The few simple steps required to assemble the parts into a completed switch do not require precision manufacturing and result in improved optical performance. The waveguide assemblies are potted together in ferrules and can be tested before assembly into the switch. The absence of expanded beam lenses leads to lower insertion loss and lower material cost. The negligible amount of waveguide bundle rotation needed to achieve all desired waveguide interconnections allows the waveguide endfaces to be polished at an angle for superior reflectance performance.

The search algorithm for the switch is simple. There is a single optimum beam position for each waveguide pairing. Since each waveguide carried by a beam moves roughly the same amount for a given actuation distance, the search routine can operate at a relatively high speed to quickly find all optimal fiber pairings. The positions of optimal waveguide pairing correspond to the matrix arrangement of the waveguides. Given the exact locations of two waveguide pairings on the corners of the matrix (home positions), the routine uses data on the physical size of the fiber to predict the approximate locations of the remaining waveguide pairings. These design advantages further help to decrease search time and make it more cost effective.

The present invention makes efficient use of space and can be readily adapted to suit a wide variety of design needs. A smaller package size is achieved for the same switched waveguide capacity. This is because two degrees of freedom allows the input and output waveguides to be arranged in more efficient matrices rather than in lines or circles. Additionally, all possible interconnections from each input waveguide to each output waveguide are useable or reachable. Optimizing design parameters such as beam length, deamplification ratio, gear ratio of the drive, and the like for the particular size constraints or performance needs of the application is easily done.

The present invention provides an optical switch having low insertion loss and low reflectance while providing performance that is stable and consistent over time, temperature and humidity fluctuations, cycling and. vibration. The optical switch of the present invention is made of relatively inexpensive components and is simple to manufacture. The optical switch is capable of switching from any number of input waveguides to any number of output waveguides, while remaining compact and adaptable to meet a wide variety of design objectives.

Other advantages of the invention will become apparent from the following detailed description and from the appended drawings in which like numbers have been used to describe like parts throughout the several views.

DETAILED DESCRIPTION OF THE PREFERRED EMBODIMENTS

Figure 1:
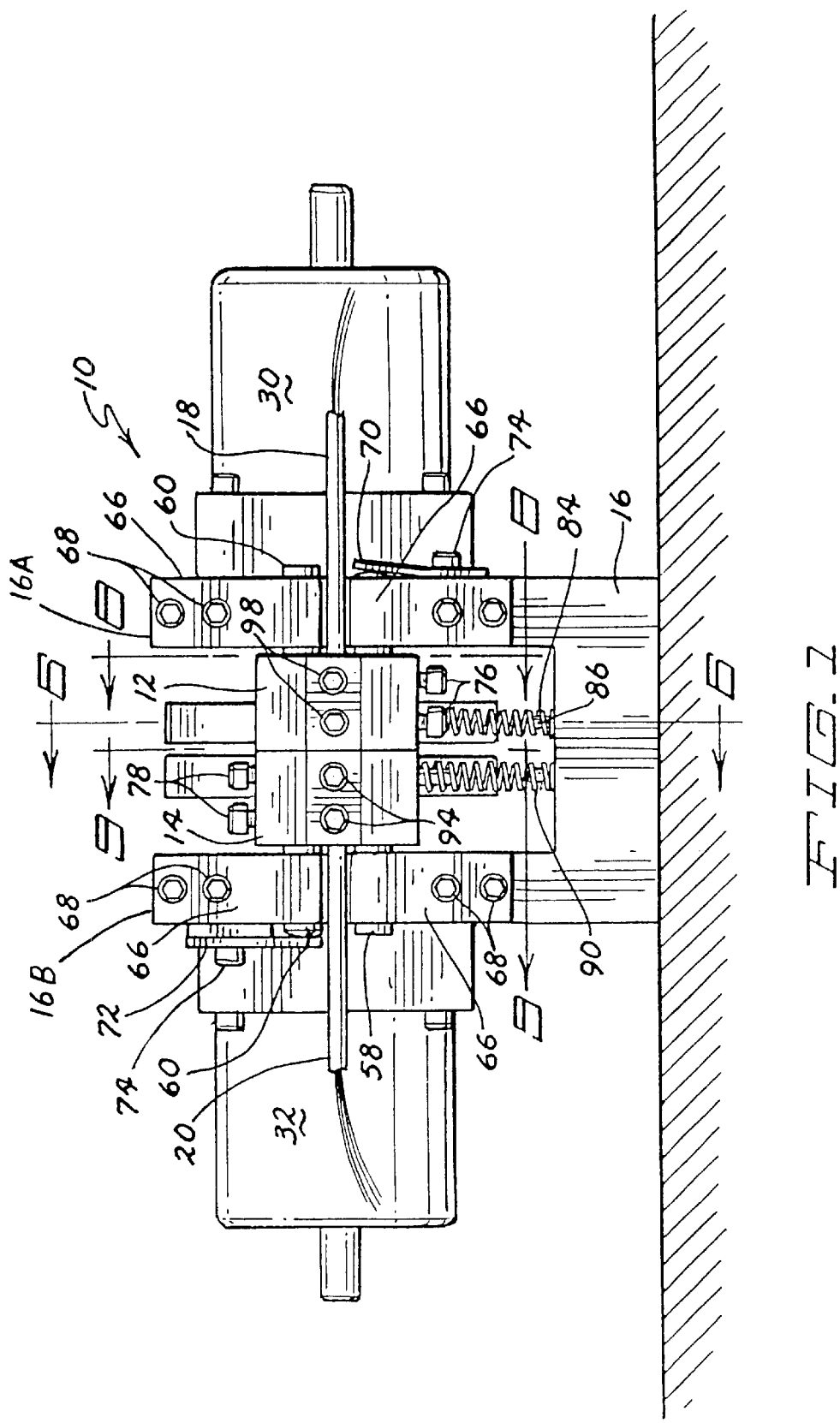
FIG. 1 is a front elevational view of a preferred embodiment of the optical switch of the present invention.
Figure 3:
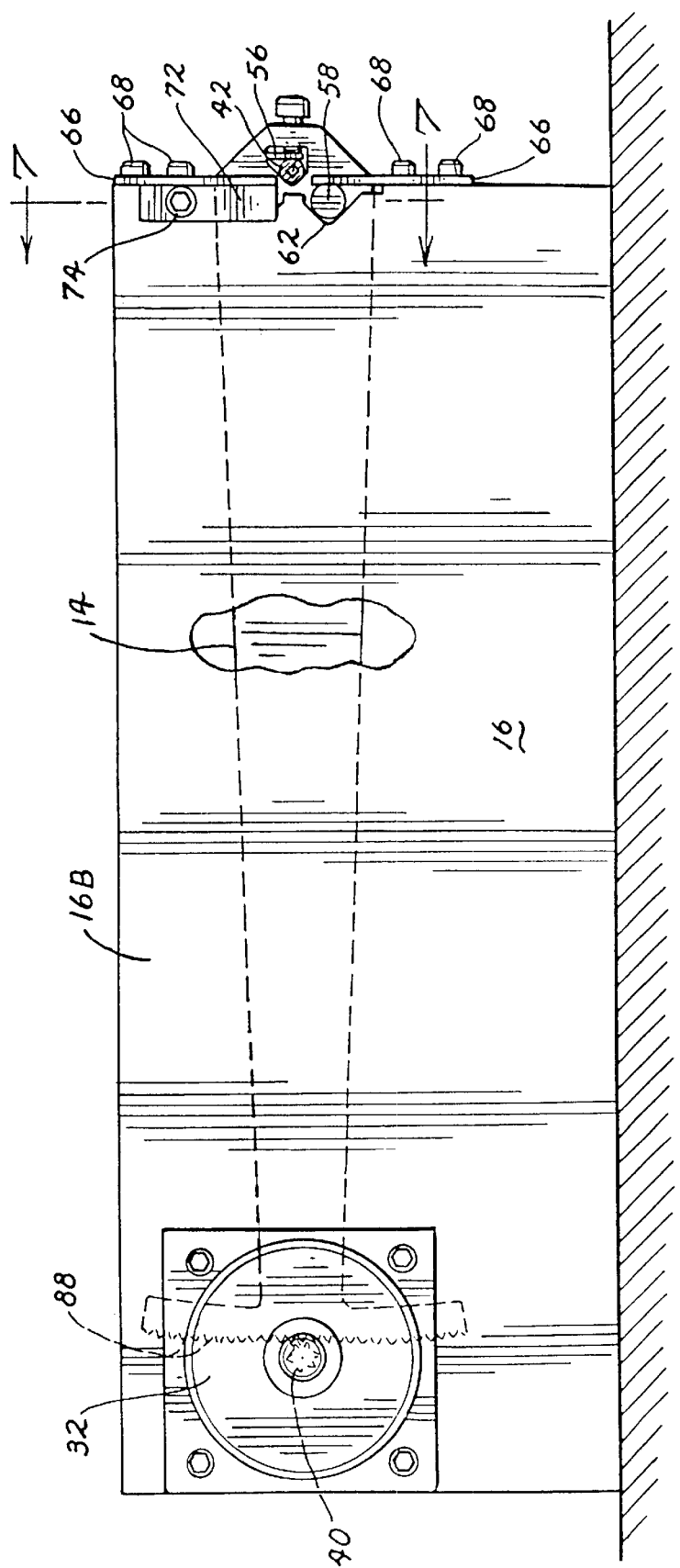
FIG. 3 is a left side view of the switch of FIG. 1.
Figure 4:
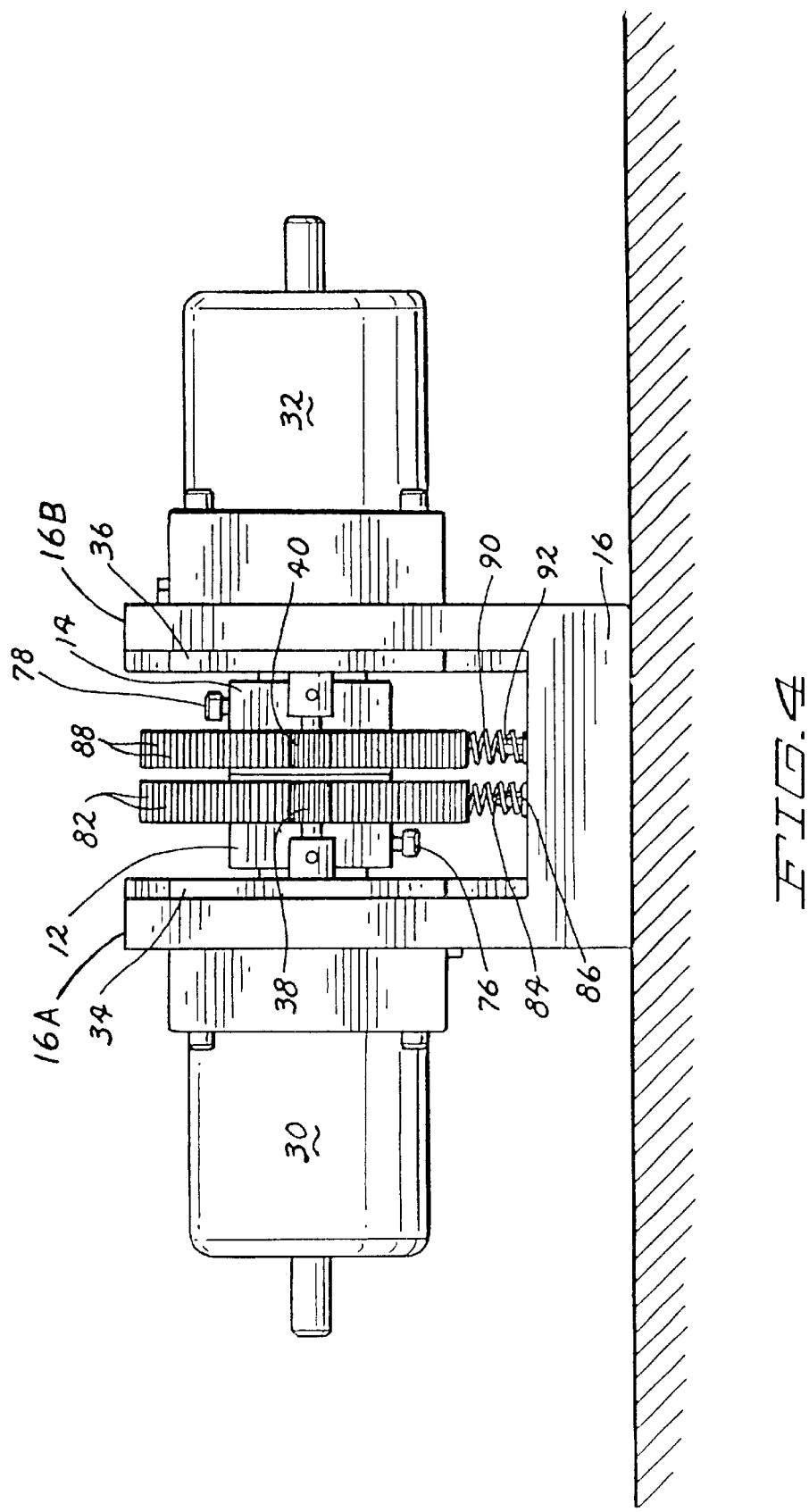
FIG. 4 is a rear view of the switch of FIG. 1.
Figure 5:
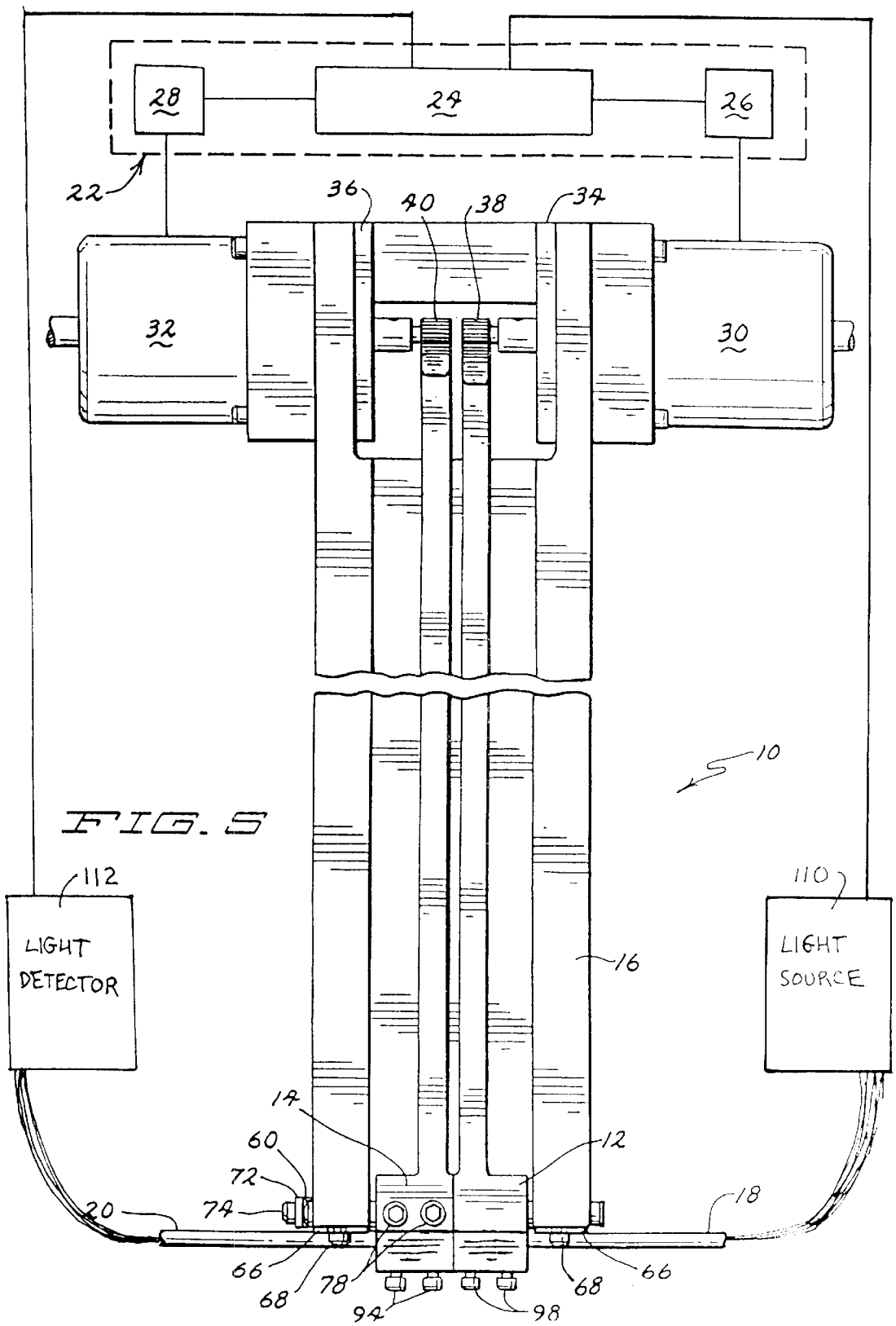
FIG. 5 is a top plan view of the switch of FIG. 1.
Figure 6:
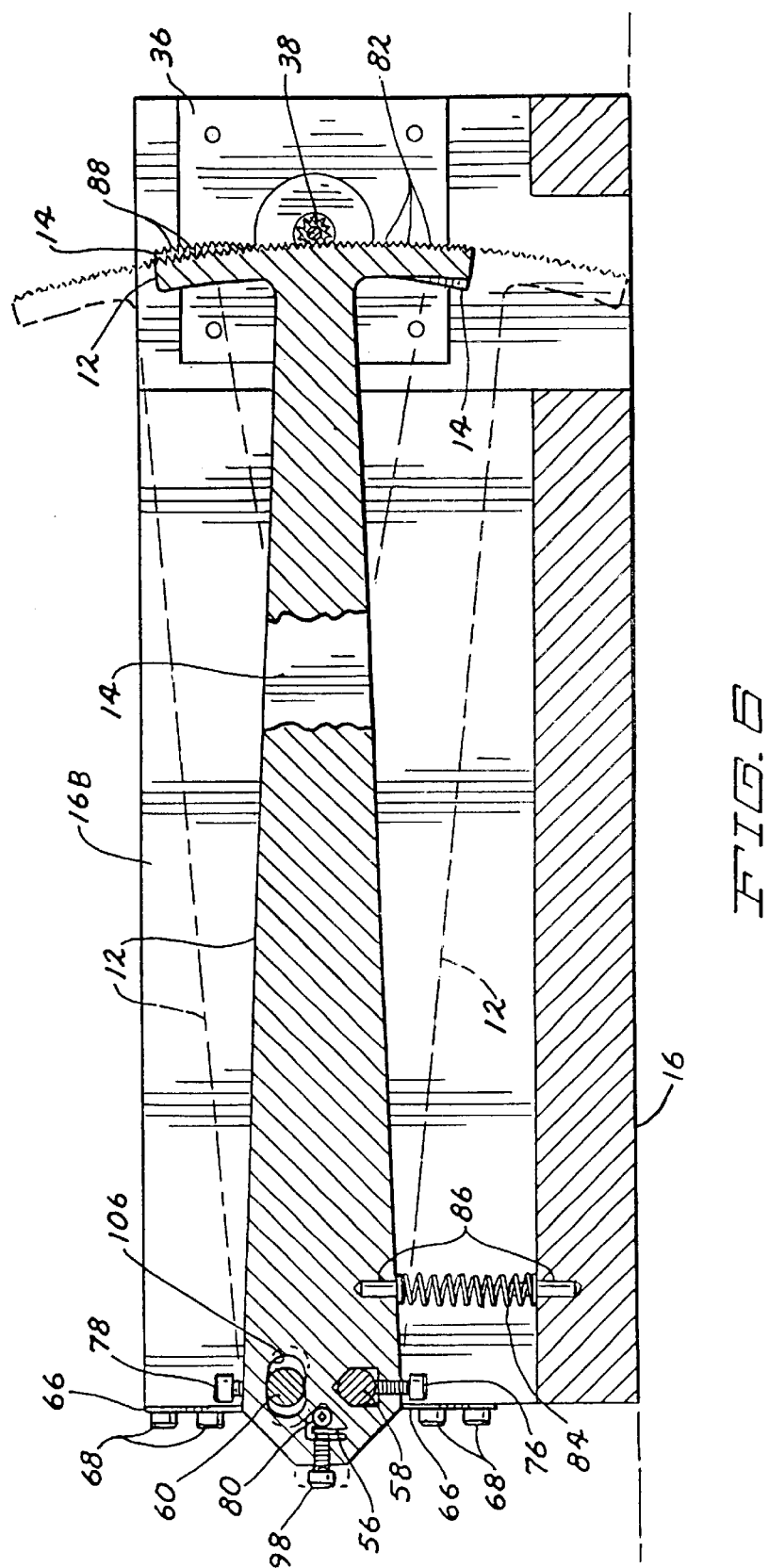
FIG. 6 is a sectional view taken along line 6—6 in FIG. 1.
Figure 9:
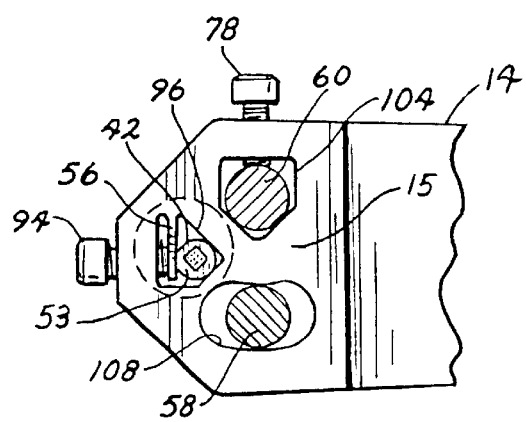
FIG. 9 is a sectional view taken along line 9—9 in FIG. 1.
Figure 10:
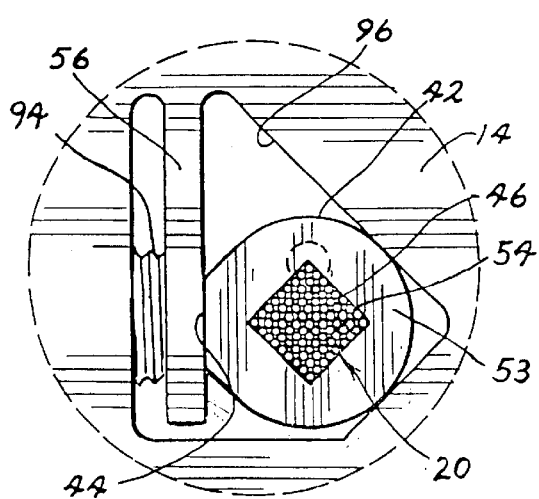
FIG. 10 is an enlarged view of a region of waveguide support of the optical switch indicated by the broken circle in FIG. 9.
Figure 11:
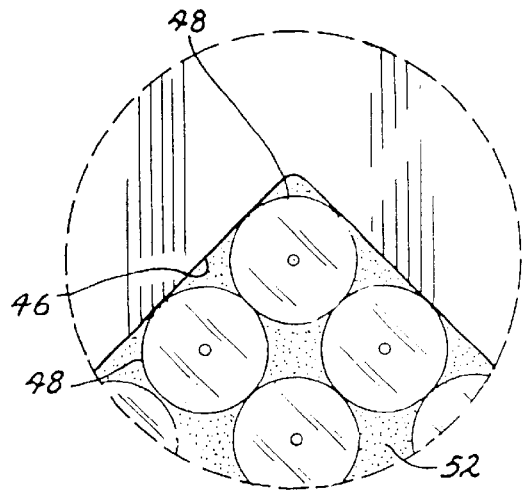
FIG. 11 is an enlarged view of a region of a waveguide support of the optical switch indicated by the broken circle in FIG. 10.

With reference to the drawings, and in particular to FIG. 1 through FIG. 11, one preferred embodiment of the two-beam optical switch is generally indicated by reference numeral 10. The switch 10 comprises four main assembly groups or sections as shown. A base section, as best shown in FIG. 1, includes a base 16 and springs 84 and 90 and is used as a frame for mounting other assemblies and components. A motor and gear assembly along with drive electronics form a section, as best shown in FIG. 5. An assembly of mounting beams or beam arms with mounted optical fiber bundles is best shown at FIG. 6. An assembly of ferrules with potted optical fiber bundles is best shown in FIGS. 10 and 11.

Base and Beam Construction

The fiber optic switch 10 has a base 16 used as a frame to maintain the proper relationship between the input 12 and output 14 beams or beam arms and to provide a mounting location for the drive motors 30 and 32. The base 16 also provides a physical end stop for the travel of each beam 12 and 14. The end stop forms the home position to which all fiber locations can be referenced.

The base 16 is constructed of a rigid, stable material, preferably such as stainless steel 303 to provide mechanical and environmental stability. As shown in FIGS. 1 and 4, the base 16 is a channel having upright side walls 16A and 16B that extend the length of the base and create a U-shaped cross section. The space between the walls 16A and 16B creates a cavity or chamber in which the beams 12 and 14 can move freely during switch operation. The drive motors 30 and 32 are mounted on one end of the base 16 in a known manner with drive pinions 38 and 40 on the motor output shafts. The motor shafts extend through provided openings in the base so the pinions are in the chamber and the motors pilot into machined recesses and are held in place with cap screws.

Fiber optic switch 10 includes an input armature or beam 12 forming a first lever and an output armature or beam 14 forming a second lever. Beam 12 is pivotally mounted on the inside of wall 16A with a rotational or pivot pin 58 and beam 14 is mounted on the inside of wall 16B with a rotational or pivot pin 60. Location of each beam about the axis of its mounting pin accounts for one of the degrees of freedom of the fibers.

Beams 12 and 14 are identical to simplify manufacturing and are made of a rigid, stable material such as stainless steel to provide mechanical and environmental stability. The inner face surface 15 of the fiber mounting hub of output beam 14, and the inner face surface 13 of the fiber mounting hub of input beam 12 are polished to reduce frictional resistance during operation. Gear sectors having gear teeth 82 and 88 are cut into the end of each beam arm opposite from the fiber mounting hubs and teeth 82 and 88 are engaged by the pinions 38 and 40 of the motors 30 and 32. At the fiber mounting hub ends the beams have first ferrule retaining apertures 96 and 100, and second apertures 102, 104 in which the rotational or pivot pins 58 and 60 are fixedly mounted.

The critical features of each beam are arranged within certain geometric constraints so as to maximize performance. The distance from the pivot apertures 102, 104 to the ferrule retaining apertures 96 is less than the distance from the pivot pins 58 and 60 in aperture 102, 104 to the motion actuation point at pinions 38 and 40. During operation, this distance ratio produces a deamplification of the driving motion at the endfaces of fibers held in apertures 96 and 100. Also, the included angle between the centers of ferrule retaining apertures 96 and 100 and the motion actuation point for the respective beam is roughly one hundred thirty-five degrees with the pivot pin axes at the roots of the included angles. This grouping ensures that the beams will be roughly parallel to each other after switch assembly. The result reduces the overall height of the completed switch while preserving the Cartesian arrangement of the two degrees of freedom required for positioning fibers.

Figure 8:
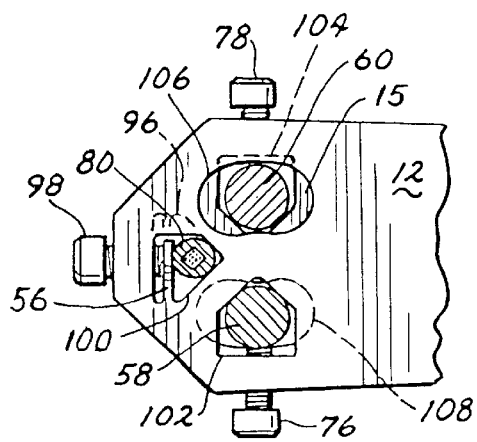
FIG. 8 is a sectional view taken along line 8—8 in FIG. 1.

As shown in FIGS. 1, 8 and 9, an input fiber bundle 18 held in an input ferrule 80 which is releasably but securely attached to input beam 12 in input ferrule retaining aperture 100, and an output fiber bundle 20 is held in output ferrule 42 which is releasably but securely attached to output beam 14 in the output ferrule retaining aperture 96. Each of the ferrule-retaining apertures comprises an integral V-groove to insure accurate placement of the respective ferrule.

To show a typical mounting of both ferrules 80 and 42 reference is made to FIGS. 8–11. The output ferrule 42 is shown assembled into output beam 14 such that a flat side surface 44 of output ferrule 42 is oriented to be in contact with a ferrule spring 56 formed integrally at aperture 96. The fiber bundles 18 and 20 each have an end face that faces toward the other fiber bundle. When installed, fiber endfaces 54 of the output fiber bundle 20 and the fiber endfaces of input fiber bundle 18 are preferably recessed into the apertures 96 and 100, less than ten microns from the interior (center facing) surface of the respective input or output beam 14 or 12 to prevent contact with the endfaces of the other fiber bundle during switch operation. The amount of the recess may be checked and controlled using interferometry.

FIGS. 9 and 10 show set screws 94 that bear against ferrule spring 56 of output beam 14 to secure the ferrule in place. The set screws maintain output ferrule 42 in the proper position and orientation in output ferrule retaining aperture 96. Similarly, as shown in FIG. 8, set screws 98 bear against ferrule spring 56 of input beam 12, which bears on a flat side surface of input ferrule 80 to maintain the input ferrule 80 in the proper position and orientation in input ferrule retaining aperture 100. Correct attachment of the ferrules insures the accurate and stable orientation of the two fiber bundles on the mounting beam arms.

Figure 17:
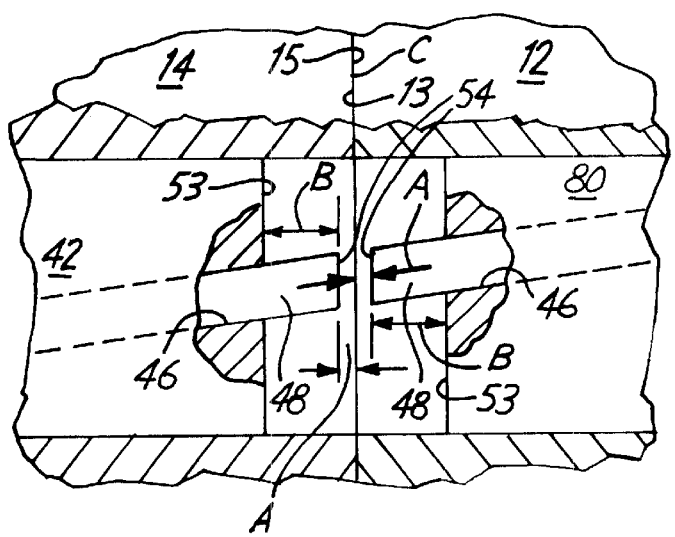
FIG. 17 is a fragmentary enlarged sectional view of ferrule mountings with the fiber bundles at an angle.

As can be seen in FIG. 17, the center plane along the interface surfaces 13 and 15 of beams 12 and 14 is shown at C, and the recess of the fiber bundle endfaces 54 into the beams from the facing surfaces 13 and 15 is indicated at A. The dimension B shows the extension of the fiber bundles from the ferrule end surfaces 53.

Figure 7:
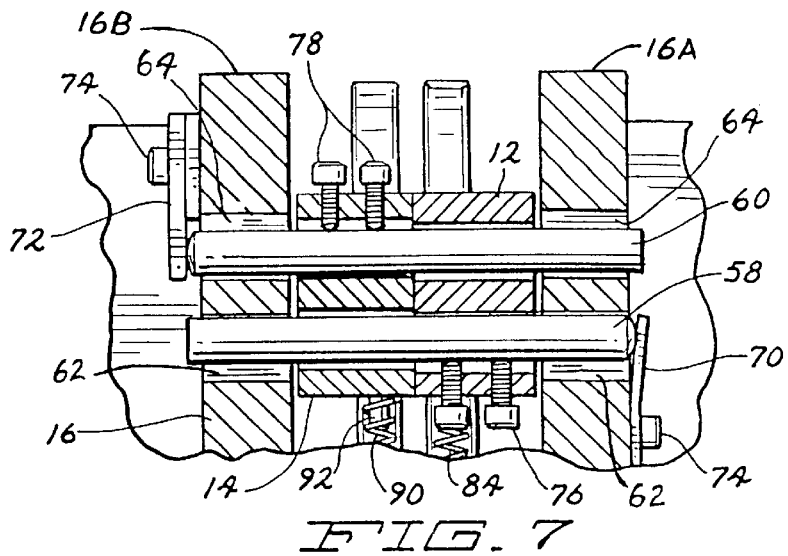
FIG. 7 is a sectional view taken along line 7—7 in both FIGS. 2 and 3.

Rotational or pivot pins 58, 60 are made of an extremely hard, smooth steel and are generally cylindrical in cross sectional shape. Rotational pins 58, 60 are preferably coated with a titanium nitride coating to improve their wear characteristics As shown in FIG. 7, the ends of rotational pins 58, 60 are preferably rounded to reduce wear. Each rotational pin is attached to its respective beam rather than to the base so as to increase the stability of the beam as it pivots or rotates. As shown in FIGS. 6 through 9, the second pivot apertures 102 and 104 of beams 12 and 14 hold the rotational pins 58, 60 are secured with set screws 76 and 78. Apertures 102 and 104 comprises an internal V-groove to ensure accurate and stable placement of the respective rotational pin.

The faces of the ends of each beam mounting the fiber bundles are in sliding contact. Input beam 12 includes a third aperture comprising an angled groove 106 that provides clearance for the projecting end of output rotational pin 60, and output beam 14 includes a third aperture comprising an angled groove 108 that provides clearance for the projecting end of input rotational pin 58. The sliding engagement of the rotational pins in the third aperture in the other beam allows the beams to be pressed together in close proximity to plane C (FIG. 17).

The fiber bundles are thus held accurately and pivoted precisely. The gears and drive motors rotate the beams about the separate pivot axes created by the offset pivot axis mounting of the rotational pins. Since the beams rotate about separate, spaced axes, controlled movement of each beam can be used to align individual fibers. The controller used retains in memory the optimum coupling location of each fiber pair, and initiates motion when requested by the user.

Ferrules with Potted Fiber Bundles

Individual optical fibers are grouped into the fiber bundles 18 and 20 as stated, and then potted into the ferrules 42 and 80. The ferrules are used to insure consistent fiber placement. The use of ferrules also isolates any issues in the potting process from impacting yield on subsequent switch assembly steps.

Referring to FIGS. 10 and 11 in particular, each fiber bundle 18 and 20 for the input and output side of the switch, respectively, consists of one or more optical fibers 48 arranged in an array. Each optical fiber 48 is conventional and consists of a core and a cladding surrounded by a protective coating 50. For single mode telecommunication applications, the core and cladding are preferably fused silica, although the optical fibers may be of any type, quantity, or size desired. Material is not critical and the dimensions of the other design elements can be scaled up or down to accommodate any fiber bundle size desired.

FIG. 11 shows a detailed view of the fibers 48 within output ferrule 42. Prior to assembly of a ferrule, it is common practice to strip the protective coating off an optical fiber 48 near the distal end. The protective coating on communications fiber is typically acrylate, which is easily removed with a chemical, mechanical, or thermal process. The bare fibers are then potted into the ferrule with a suitable adhesive 52, and the adhesive is cured. The stripping process is necessary because acrylate is not sufficiently stable over the expected variations of environmental conditions.

Referring to FIGS. 8–11, output ferrule 42 has a lumen 46, preferably having a square cross section, through which optical fibers 48 pass. A square lumen efficiently uses space and places each fiber in a matrix in a fairly predictable location with respect to other fibers. Fiber location will be somewhat random; however, this does not impact performance. The reduced variability provided by a square lumen allows for a simplified control algorithm to locate input and output fiber pairings. Both the input and output ferrule lumens are sized to accommodate the intended fiber capacity of the switch.

Figure 16:
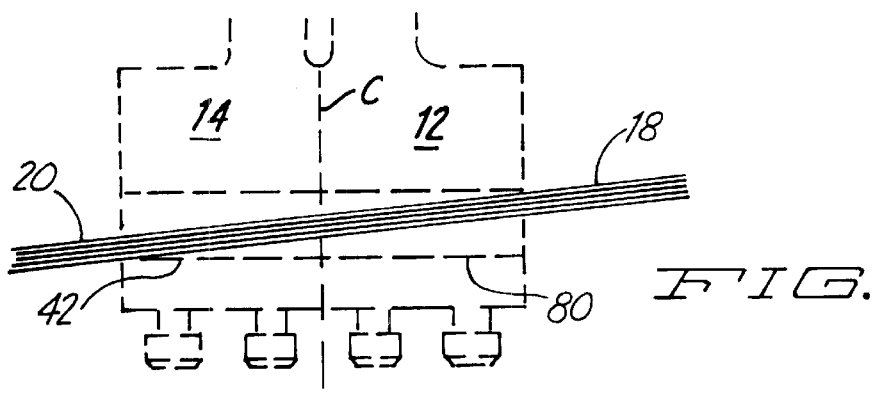
FIG. 16 is a schematic representation of fiber bundles positioned at a elected angle relative to the supporting beams.
Figure 17A:
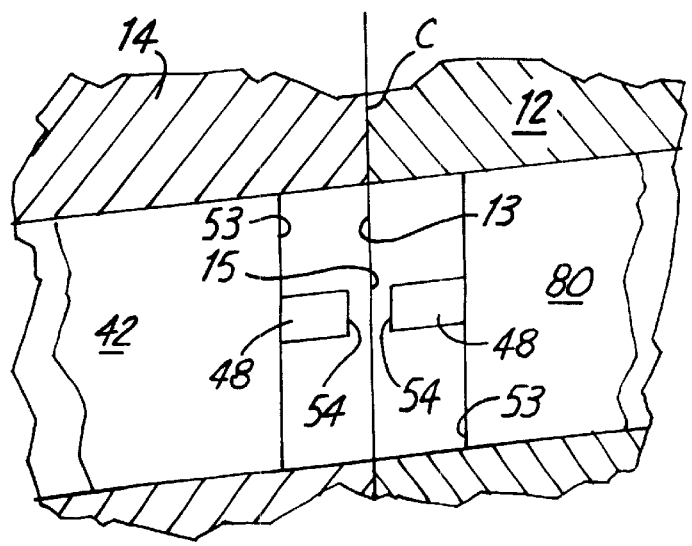
FIG. 17A is a fragmentary enlarged sectional view showing the ferrules mounted at an angle in the beams

Referring to FIGS. 16, 17 and 17A the lumens 46 are preferably cut in the respective ferrules 42 and 80 at an angle that is nonperpendicular to the beam inner side surfaces 13 and 15 after assembly. In particular, the lumens 46 of the ferrules are formed suc:h that their axes are nonperpendicular to the input and output ferrule distal endfaces 54. A slope of six degrees relative to a direction approximately perpendicular to flat surfaces 53 of ferrules 42 and 80 is preferable. The input lumen 46 is symmetrically oriented such that its axis aligns with the axis of the output lumen 46 once the ferrules 42 and 80 are assembled in the respective beam. The lumens 46 are arranged this way to permit the use of the angled fiber endface method to minimize reflectance. Alternatively, as shown in FIG. 17A, an angled endface arrangement can be accomplished by mounting ferrules 42 and 80 with lumens perpendicular to the surfaces 53 of the ferrules on beams that have openings for the ferrules positioned at the desired angle relative to the center plane C between the beam. The ferrule axes are then at an angle relative to the beam surfaces 13 and 15.

The ferrules 42 and 80 are made of a rigid, stable material such as stainless steel or ceramic. The flat surfaces of the ferrules against which the ferrule springs bear insure proper orientation of the ferrule lumen with respect to the respective beam. This is particularly important Lo insure that the angled endfaces of the input and output ferrules align. Suitably prepared optical fibers 48 are inserted into lumens 46 along with adhesive 52 until the distal endfaces 54 of optical fibers 48 protrude past the distal end surfaces 53 of output ferrule 42 and input ferrule 80. Adhesive 52 is cured according to the manufacturer's recommendations. Optical fibers 48 are preferably cut with a diamond saw such that they protrude approximately 250 microns beyond the distal surfaces 53 of output and input ferrules 42 and 80, as indicated by dimension B in FIG. 17. The distal endfaces 54 of the fibers are then polished such that they will be parallel to the respective beam side surface or face after assembly. After polishing, distal fiber endfaces 54 are preferably coated with an anti-reflective coating to reduce the insertion loss and the insertion loss variation due to Fresnel reflections.

Beam Pivotal Mounting

Figure 2:
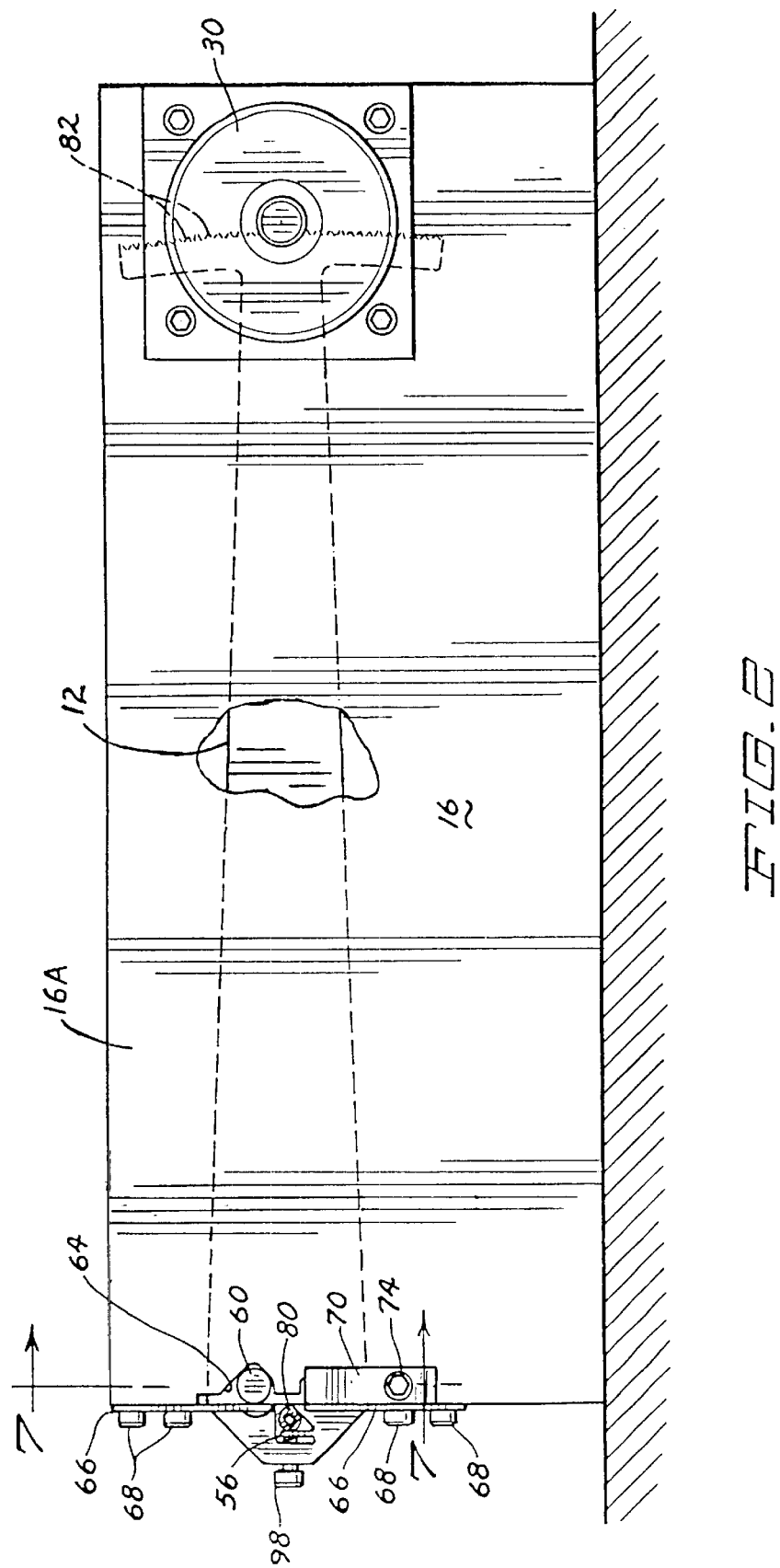
FIG. 2 is a right side view of the switch of FIG. 1.

The beams 12 and 14 are pivotally mounted on the opposite end of the base 16 from the motors 30 and 32. As shown in FIGS. 2 and 3, first and second V-grooves 62, 64 are machined into walls 16A and 16B of base 16. These V-grooves pivotally receive the first and second rotational or pivot pins 58, 60, respectively. Radial pin springs 66 are preferably stainless steel and are fastened to base 16 by screws 68. Radial pin springs 66 provide a force to hold rotational pins 58, 60 in V-grooves 62, 64 while allowing rotational pins 58, 60 to rotate therein. FIG. 7 shows a cutaway view of the relationship between the two rotational pins and the respective V-grooves.

Referring to FIG. 7, it can be seen the assembly of rotational pins 58 and 60 and beams 12 and 14 is maintained in axial relationship by axial pin spring 70, which is a leaf spring fastened to base 16A with a screw 74. The spring 70 bears against an end of first rotational pin 58. Since input pin 58 is rigidly attached to input beam 12 with set screws 76, the inner side surface or face 13 of input beam 12 is in turn urged against the inner side surface or face 15 of output beam 14. Since output beam 14 is rigidly attached to output rotational pin 60 with set screws 78, output rotational pin 60 is in turn urged against pin stop 72. Pin stop 72 is a hard, rigid material such as stainless steel and is rigidly attached to base 16B with a screw 74. The resulting arrangement provides a controlled force that urges the beams together to maintain a constant gap between the fiber bundle endfaces.

Gears, Motors, and Drive Electronics

FIG. 5 shows the stepper motors 30 and 32 with attached pinion gears that are used to drive the beams to their desired positions for proper input and output fiber alignment. Each motor is wired to its motor controller 26 and 28 that receives commands from a control interface 24.

Motors 30 and 32 are preferably commonly available stepper motors. Input motor 30 and output motor 32 are attached to base 16 using input motor mount 34 and output motor mount 36, respectively. An input pinion 38 on the shaft of motor 30 drives input gear teeth 82 on beam 12. An output pinion 40 on the shaft of output motor 32 drives output beam gear teeth 88 on output beam 14.

When the pinions 38 and 40 rotate, input beam 12 or output beam 14 rotate or pivot about the axis of the respective rotational pin 58 or 60. The gear ratios between the input pinions and the beam teeth deamplify rotational movement. An input bias spring 84 is attached on its ends to anchor pins 86 embedded in input beam 12 and base 16 and provides a force to urge input beam teeth 82 and pinion 38 together, which results in an anti-backlash engagement of the teeth. An output bias spring 90 is attached on its ends to anchor pins 92 embedded in output beam 14 and base 16 and urges teeth 88 and 40 together.

As shown in FIG. 5, the drive electronics 22 of the preferred embodiment include the controller interface 24, and controllers 26 and 28. Motor controllers 26, 28 are preferably widely available micro-stepper controllers that provide both the indexer and motor drive electronics required to drive input motor 30 and output motor 32, respectively. Controller interface 24 is preferably a computer or microprocessor with electronic input and output capabilities and custom interface software. In addition, interface 24 contains memory and all the routines needed to convert user commands into motion control logic. It is designed to provide the command interface between the motor controllers 26, 28 and a person or other electronic equipment that gives the command to optically couple any specific fiber pair.

The interface 24 also contains the components and routines needed to "home" the optical switch 10 upon power-up and to diagnose subsequent failures. As shown in FIG. 5, two fibers from the input fiber bundle are attached to device light source 110. Preferably, the selected fibers are positioned in diagonal corners of the lumen 46 in input ferrule 80 for input fibers. When power is applied to the device light source 110, it will illuminate both input fibers. Similarly, two fibers from the output fiber bundle are attached to device light detector 112. Preferably, these fibers are positioned in diagonal corners of the lumen 46 in output ferrule 42 for output fibers. When powered the device light detector 112 will detect light that enters either of the two connected output fibers. Together, the device light source and device light detector will be used to establish a repeatable home position and to actively compensate the switch for wear.

The switch and its electronics are packaged in a protective case for use by the customer. Any of several standard fiber optic connectors may be added to the free ends of the input and output fibers for convenient installation of the switch by the customer. Mechanical assembly is now complete. However, before the switch is usable, two further process steps are required. The optimum position of each desired fiber pairing must be established relative to a fixed reference and these locations must be stored in memory of control interface 24. Once this is done, each fiber pairing can be repeated whenever the user desires.

Preparation for Searching and Optimizing

A procedure called searching and optimizing is used to locate the optimal coupling position for each fiber pair. Additional instrumentation is required to perform this procedure. A test source is attached to a selected input fiber on the device. The test source will provide a light signal for use in optimizing the alignment of each output fiber. Next, the entire output fiber bundle is inserted into a large area photodetector. The photodetector will provide feedback to the control interface 24 on the degree of alignment achieved for each fiber pairing. Finally, a test controller is used in place of the device controller to issue commands to drive the motor Controllers. The test controller contains the hardware and software necessary to respond to the photodetector signal.

Before the search begins, a home location for each beam must be established. The first step is to establish a physical stop by intentionally driving the gear section of each beam toward the base 16 until they stop on the base and the motors stall. The motor current is turned off and the stepper motor counts for each motor are rezeroed in the controller to establish the physical stop position.

The home location is then established to improve upon the accuracy provided by the physical stop position. The optimum position of one pair (one input and one output fiber perfectly aligned) of the two fiber pairings attached to the device light source and device light detector forms the home location. The locations of all other fibers are referenced to this home location. The beams are then positioned at a set, known distance above the base and the search algorithm is initiated.

To further improve the accuracy of this method, a second pair of fibers from the opposite diagonal corners of each bundle is connected to the device light source and device light detector. By optimizing this second fiber pairing (one input fiber and one output fiber) as well, a second point of reference is established. Because the relationships between the fibers within a bundle are very stable, this second point enables the switch to compensate for any errors due to wear or other environmental effects regardless of how they affect the orientation of the fiber bundles.

This method provides a home location with superior repeatability. In addition, the home location can be completely reoptimized on each switch power-up or selectively before a critical measurement. This provides a means to actively compensate for mechanical wear and other environmental effects in the switch.

Searching and Optimizing Routines

The search and optimize routines are quite simple. Each beam is moved separately so as to travel in an approximation of rectilinear motion along a Cartesian coordinate (x-y) system. During this movement, the response of the large area photodetector is monitored. The optimization subroutine is called when a signal is sensed that exceeds a previously defined threshold value.

The optimization subroutine conducts a localized search to determine the beam positions that correspond to the local signal maximum. Throughout the optimization process, the beams are always moved in a consistent direction and sequence while approaching the maximum signal location. Motion is conducted in this manner to eliminate the hysteresis effects that friction between the beams can create. Later, during operation of the completed and optimized switch, the same direction and sequence of beam motion will be employed to replicate the optimimum beam positions. This method reduces variation and ensures that performance in the field will duplicate that obtained in the factory.

A convergence routine is employed to accomplish optimization. The point at which the threshold signal was sensed becomes the center point for the optimization search. An imaginary box is drawn around this point with the length of each side approximately equal to the diameter of the optical fiber core. The beams are then moved so that the input fiber coincides with a diagonal of the box. The input beam and the input fiber are then moved so the input fiber traverses two adjacent sides of the imaginary box. As the input fiber moves, the output fiber bundle is monitored. For each side of the imaginary box, a point of maximum signal is determined. These coordinates become the center point of a new optimization box with smaller sides. The optimization routine is repeated for as many iterations as desired. Typically, convergence is reached within three cycles with this routine.

After optimization, the input and output beams are positioned relative to each other such that the lighted input fiber is perfectly aligned with one of the output fibers. The pivotal location or position of each beam is measured by determining counts used by the stepper motors with respect to its home position. The measured locations of the two beams establish a set of coordinates that correspond to the optimal alignment position. These coordinates are temporarily stored in test controller memory. After the coordinates are stored, the search routine is resumed from the point at which it began optimization.

The iterative search and optimize process continues until all fiber pairings have been found and the corresponding positions of the beams stored in memory or the desired territory has been searched. Upon completion, all optimum coupling locations for the switch are transferred from the test computer memory to the switch device memory. The switch now has all the information required to fill a user request to couple any pair of fibers. The logic on the device controller circuit hoard will access the appropriate coordinates in device memory and issue commands to drive the beams to the correct positions.

Operation of Preferred Embodiment

When input pinion 38 rotates, input beam 12 rotates about the axis of input rotational pin 58. Similarly, when output pinion 40 rotates, output beam 14 rotates about the axis of output rotational pin 60. A relatively large rotational movement of input pinion 38 translates to a relatively small rotational movement of input beam 12. The deamplification provided by the gear ratio is further increased by the long distance from the beam pivot to the gear and the short distance from the pivots to the fiber bundles. The combination provides a method for precisely translating input fiber bundle 18 in an arc. The arc traced out by the translation of input fiber bundle 18 is substantially perpendicular to the arc traced out by the translation of output fiber bundle 20. This relationship provides two degrees of freedom for positioning or mispositioning any pair of fibers in the two fiber bundles 18 and 20 with respect to each other.

Optimum beam coordinates for all fiber pairs are stored in memory of the controller interface 24. Controller interface 24 receives an input command to optically couple a specific fiber pair and recalls the coordinates of that fiber pair. The command is translated into the electrical drive signals required to step the motors 30 and 32 to move the beams. Controller interface 24 outputs the information to motor controllers 26, 28 using the motor controller protocol and the motors are stepped as needed to reach the desired position. In this fashion, any optical fiber in input fiber bundle 18 may be selectively optically aligned with any optical fiber in output fiber bundle 20.

Operation in Typical Applications

Typical applications for the switch include, among others, remote fiber testing of fiber optic cables in a digital data communications line, testing of multiple fiber optic devices in a laboratory setting, or multiplexing of fiber optic sensors in a smart structure. Regardless of the end application, the operation of the switch will be similar. Upon power-up, the switch rezeroes to the home location by establishing a physical stop and then using the light source and detector to optimize the chosen input and output fiber pairing. If a second fiber pair are attached to the light source and detector, the second home can be established by reoptimizing this pairing.

The new locations of these fiber pairings are compared to the original locations. Depending on the magnitude of the difference, the switch can signal an error or use the difference to mathmatically compensate the remaining fiber pairing locations and continue operation. Since all other fiber pairing positions are determined relative to the home location, any wear in the switch mechanism is then actively compensated.

The user enters a command to switch fiber couplings via a front-panel keypad or direct input to the computer interface, among other possible means. As described above, once a valid command is entered, the switch will adjust the beams to match the optimum beam locations stored in memory. The approach distance and motion sequence used to move each beam will closely approximate that used in the initial search and optimize routine used to determine the optimal location for reasons described previously. If power cycling is infrequent, the switch can be programmed to automatically initiate the power-up rezeroing routine at a predetermined number of intervals. Rezeroing can also be programmed after a given number of switching sequences has been completed, after a given amount of time has passed, or when a predetermined minimum change in environmental conditions has occurred.

Description of the Alternative Embodiment

Figure 12:
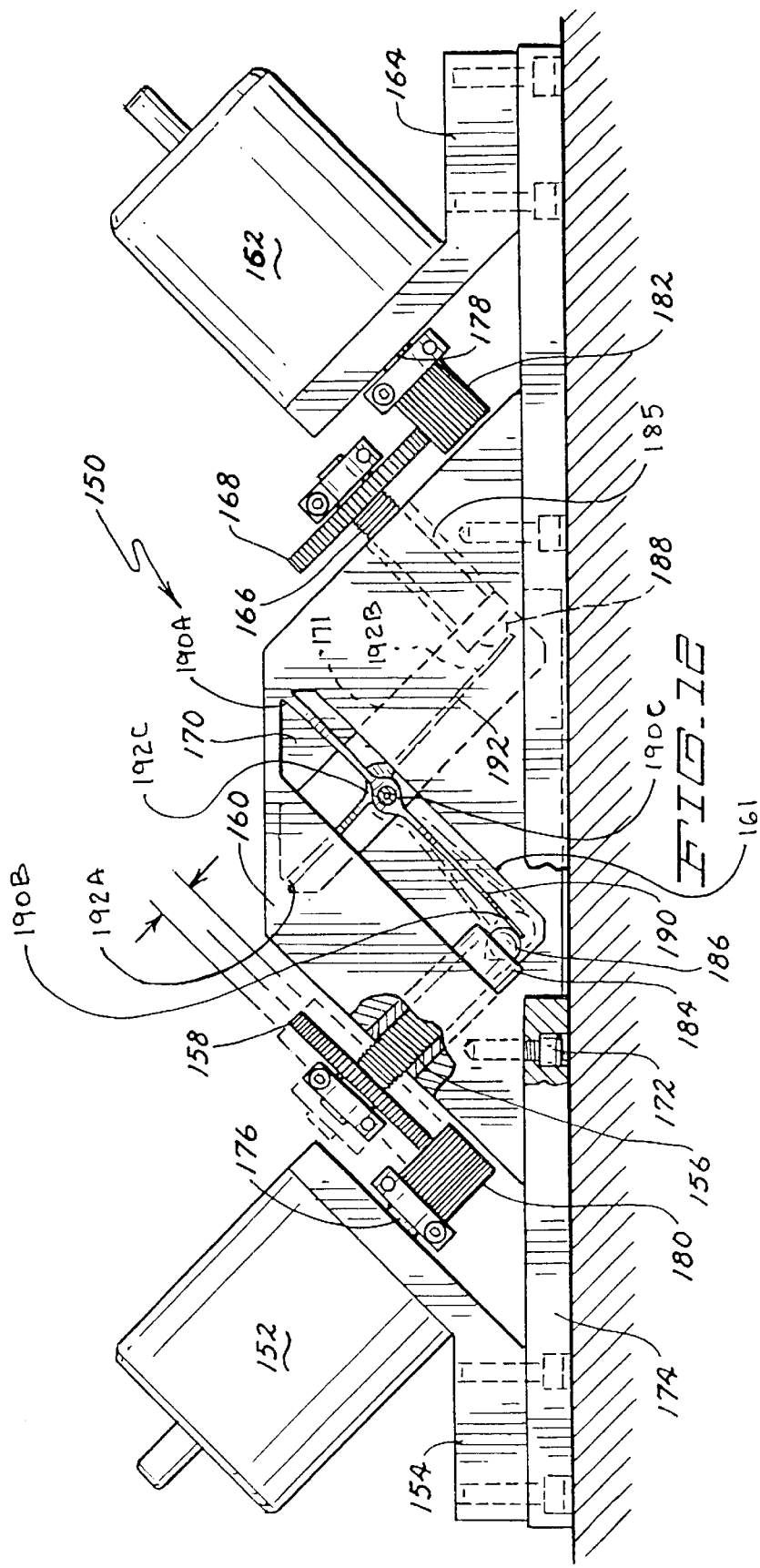
FIG. 12 is a front view of an alternative embodiment of the optical switch.
Figure 13:
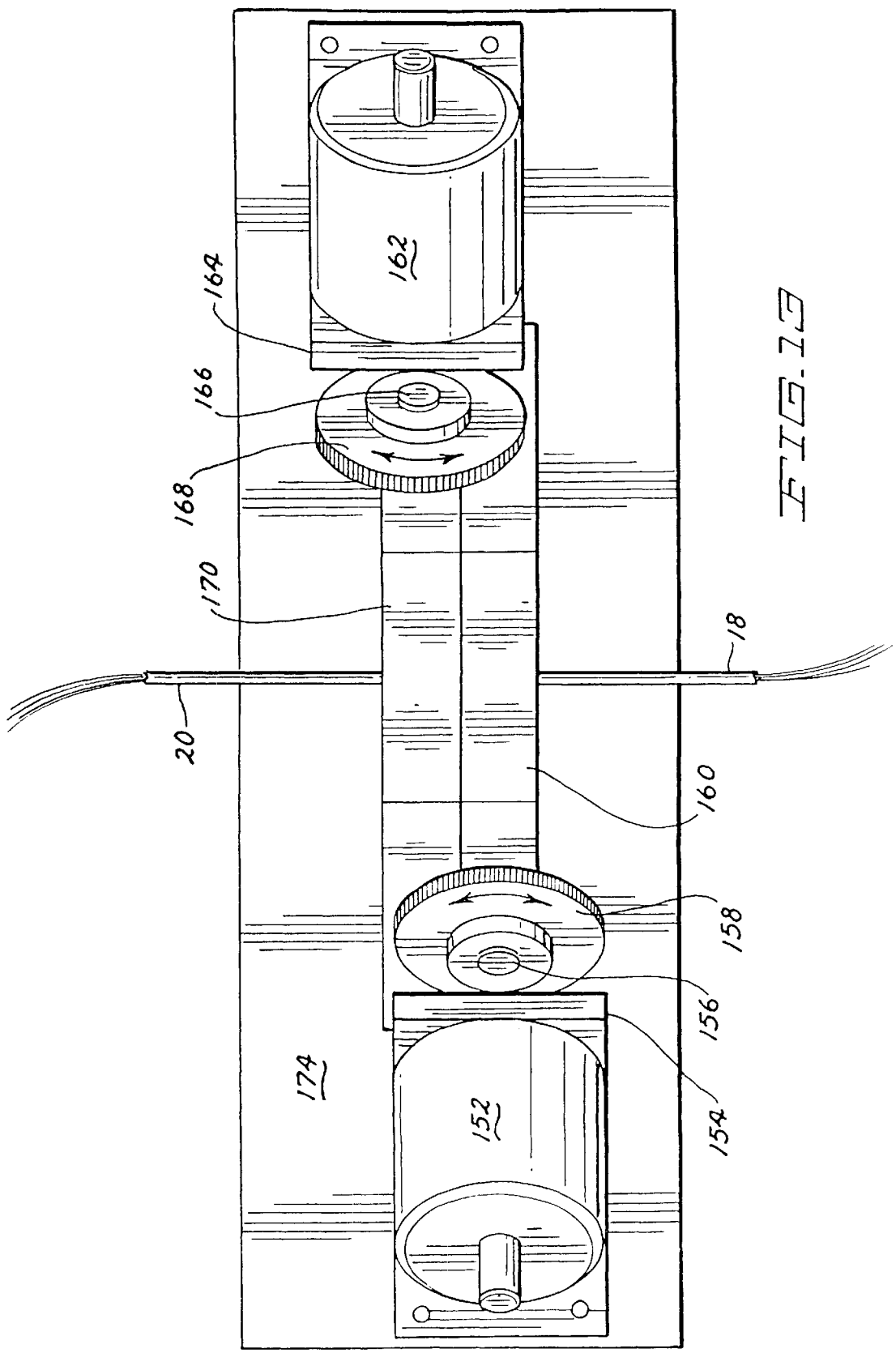
FIG. 13 is a top view of the embodiment illustrated in FIG. 12.

FIGS. 12 and 13 disclose an alternative embodiment of the fiber optic switch, generally indicated by reference numeral 150. The switch 150 includes input and output potted fiber bundles 18 and 20, with beams that hold the fiber bundles and control movement of the fiber bundles using motors and gears, as in the first form of the invention.

The input and output fibers are mounted in ferrules. A ferrule is attached to each beam. The beams are integral to the bases. The bases are positioned such that the endfaces of the ferrules oppose each other. The gears, motors and drive electronics cause the beams to flex about the separate axes created by the offset hinge points. Since the beams rotate about separate axes, controlled movement of each beam can be used to align individual fibers. The controller disclosed in the first form of the invention may be used with the alternate embodiment and it will retain the optimum coupling location of each fiber pair. The interface initiates motion when requested by the user.

Individual fibers are bundled and potted into ferrules in the same way as described for the preferred embodiment. The ferrules holding the fibers are constructed in a like manner. The reflectance generated by fiber optic switch 150 may be reduced by the use of an anti-reflective coating, an index matching medium or an angled polish. The index matching medium and the anti-reflective coating have the added benefit of reducing the insertion loss and the variation in the insertion loss. Like the preferred embodiment, optical switch 150 preferably uses a combination of an angled polish and an anti-reflective coating.

Beams Integral to Bases with Attached Ferrules

Each beam and its associated base are made from one piece of material such that the beam is integral with the base and moves by flexing at pivot. The bases 160 and 170 are ground to a controlled width or thickness as shown in FIG. 13 and a section of slightly lesser thickness (recessed) is created on the inwardly facing sides in the location where the beams will be formed. This recess will create a gap between the beams formed in the bases after assembly that will prevent frictional interaction of the beams. Material is removed to form openings 161 and 171 through the material block as shown in FIG. 12 to form the beams 190 and 192. The beams are attached to their respective base at ends 190A and 192A and the opposite ends 190B and 192B of the beams are free to move as the beams are flexed about the integral attachment at ends 190A and 192A.

The input and output beams 190 and 192 are identical to simplify manufacturing and are made of a rigid, stable material such as stainless steel or ceramic to provide mechanical and environmental stability. Each beam is preferably constructed with a uniform width (slightly less than the width of its base) and a depth that tapers (reduces) along its length in direction from ends 190A and 192A to ends 190B and 192B. A ferrule hub 190C and 192C is formed midway along the length of each beam and each hub has an aperture for holding a ferrule of an optical fiber bundle. Apart from the hub, the maximum beam depth occurs near its point of attachment to the base at the ends 190A and 192A. Tapering the beams 190 and 192 spreads bending stress evenly along the length of each beam as it is actuated. Each beam is formed in a curve initially, with the ends 190B and 192B curved upward toward the actuators that move the beams when unloaded. This curve applies a pre-load to the respective actuator when installed and moved by the actuator to a planar position and ensures that the beam will be operable in a nearly planar position in both directions for its intended range of motion.

It is preferred that fiber bundles 18, 20 be mounted to flexible input beam 190 and flexible output beam 192, respectively, in a fashion similar to that used with the first embodiment of the fiber optic switch. The endfaces of the fiber bundles are preferably positioned such that they are ten microns back from the inner side surface or face plane of the respective base. This location will extend the fibers somewhat beyond the width of the beam. However, it is not so far extended as to allow the input and output endfaces to collide during operation. After ferrule installation, the bases are assembled with one base rotated 180° so the planes of the beams cross near the ferrule hubs 190C and 192C, and then the bases are secured in place with fasteners onto a support plate 174.

Gears, Motors, and Drive Electronics

The beam actuators in the second form of the invention are screws installed in each base and threadably movable in directions toward and away from each beam. A screw drive train includes screw collars 184 and 185 with internal thread fixed in the bases. Input screw 156 and output screw 166 preferably with matching high precision, wear-resistant external threads, respectively are threaded into the screw collars. The screw collars are rigidly attached to bases 160, 170, respectively, with an adhesive such that the screw axes are generally perpendicular to the respective beams with the beams substantially planar, and the screw axes are parallel to the axes of motor output shafts 176, 178 and pinions 180, 182 which are driven by motors 152 and 162. An input ball 186 is mounted on the distal end of input screw 156 and an output ball 188 is mounted on the distal end of the output screw 166. The balls provide approximate single point contact when engaging the beams to minimize the rotational force translated to the beam by turning of the screw. An input gear 158 is mounted to the top of input screw 156 and an output gear 168 is mounted to the top of output screw 166. The gears are split and have integral anti-backlash springs to improve positioning repeatability Referring to FIG. 13, input motor 152, input motor mount 154, input screw 156, input gear 158 and input base 160 are all aligned along the same plane. Similarly, output motor 162, output motor mount 164, output screw 166, output gear 168 and output base 170 are also aligned along the same plane. Input motor mount 154, input base 160, output motor mount 164 and output base 170 are all fixedly attached as by screws 172 to support plate 174. Preferably, motor mounts 154, 164 are made of a rigid material such as stainless steel. Motors 152, 162 drive shafts 176, 178, respectively, to which are mounted input pinion 180 and output pinion 182, respectively. Input pinion 180 meshes with input gear 158, which in turn drives input screw 156. Similarly, output pinion 182 meshes with output gear 168, which in turn drives output screw 166. The motors 152, 162 preferably are stepper motors.

It can be seen that by flexing or bending the beams 190 and 192 by operating motors 152 and 162, the position of the hubs 190C and 192C and the apertures of the hubs will change relative to each other in a known manner. The movement of the hubs, and thus the fiber bundles held in the apertures is controllable and proportional to the movement of the input screw 156 and output screw 166. The pairing of fibers in the facing fiber bundles can thus be controlled.

Searching and Optimizing Routines

Before the switch is used, two process steps are carried out. The optimum position of each desired fiber pairing of the facing fiber bundles must be established relative to a fixed reference and these locations must be stored in memory of the motor controller. Once this is done, each fiber pairing can be repeated whenever the user desires. The motor controller can be the same as in the first form of the invention.

The preparation equipment and setup required prior to initiating the search and optimize routines are identical to that performed for the first form of the invention. Likewise, the routines used to search for fiber pairings and optimize their locations are also identical. Each beam 190 and 192 is moved separately so as to travel in an approximation of rectilinear motion along a Cartesian coordinate system. During this movement, the response of the large area photodetector is monitored. If a signal is sensed that exceeds a previously defined threshold value, the search routine calls the previously described optimization subroutine.

Operation of Alternative Embodiment

As input screw 156 is driven by input pinion 180, input ball 186 bears against flexible input beam 190, to which input fiber bundle 18 is releasably attached. Similarly, as output screw 166 is driven by output pinion 182, output ball 188 bears against flexible output beam 192, to which output fiber bundle 20 is releasably attached. A relatively large rotational movement of input pinion 180 translates to a relatively small movement of input beam 190 and provides a method for precisely translating the hub 190C and input fiber bundle 18 in an arc. The arc traced out by the translation of input fiber bundle 18 is substantially perpendicular to the arc traced out by the translation of output fiber bundle 20 held by hub 192C, providing two degrees of freedom in positioning the fiber bundles with respect to each other. All other operational aspects and possible applications are identical to the preferred embodiment.

Description and Operation of A Non-Adjustable Embodiment

Figure 14:
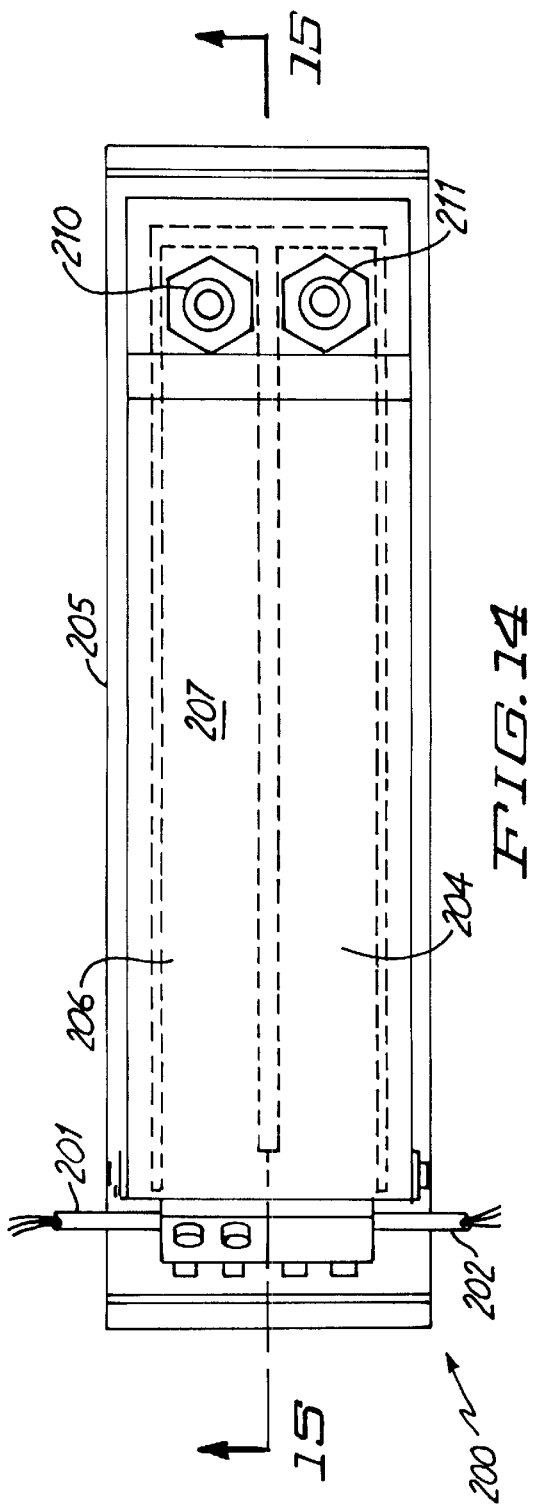
FIG. 14 is a top view an alternate embodiment of the optical switch shown in FIG. 1 that is not adjustable.
Figure 15:
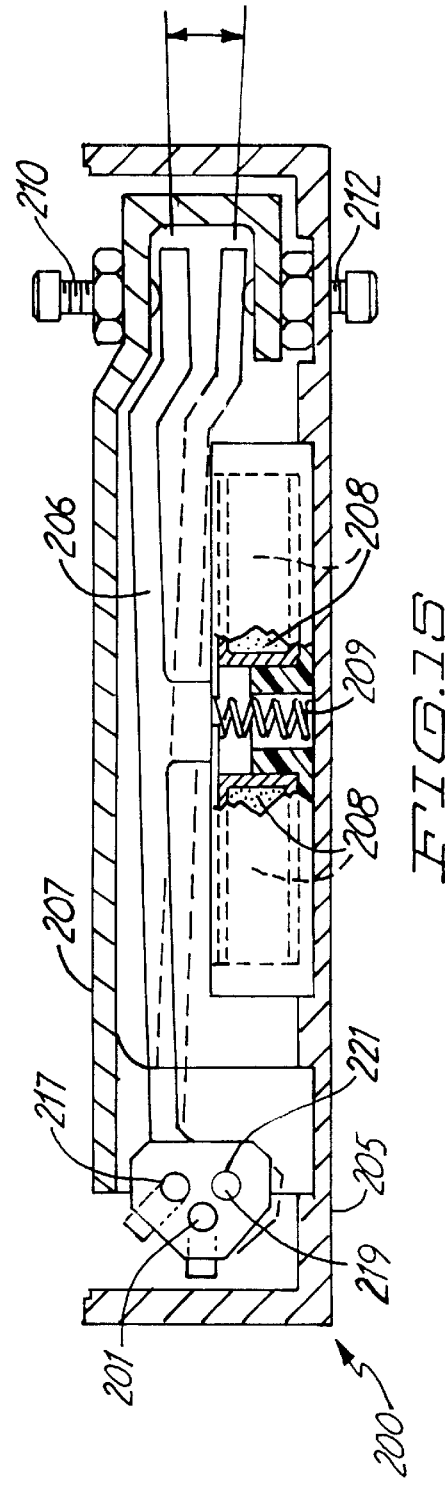
FIG. 15 is a sectional view taken along line 15—15 of FIG. 14.

FIG. 14 discloses another alternative embodiment of the fiber optic switch, generally indicated by reference numeral 200. This embodiment differs from the previous two embodiments in that the method used to actuate the beams does not provide adjustability. The result is either a single 1×2 or two 1×1 (on-off) switches. The scale of the non-adjuscable device is reduced to correspond to the limited fiber capacity. Except for these differences; the primary elements of this embodiment are very similar to those previously described.

Input and output ferrules 201 and 202, are constructed in the same manner as input ferrule 80 and output ferrule 42 of the first embodiment. Input beam 206 and output beam 204 may be either rigid or flexible. Both beams are pivotally attached to an upper base 207 about separate axes. Input beam 206 is attached with a pivot pin 217 and is urged upward by an input spring 209 until it comes in contact with an upper adjustable input stop 210. Similarly, the output beam 204 is urged upward by an output spring about its pivot pin 219 which is shown in cross section in a guide slot 221 formed in the mounting end of input beam 206. The pivot pins 217 and 219 are secured in the mounting ends of the beams 206 and 204 and pivot on side walls of upper frame 207. The output beam 204 will pivot until it comes in contact with an upper adjustable output stop 211.

Adjustability is eliminated by the method chosen to actuate the beams. Preferably, an electromagnetic actuator 208 is attached to a lower base 205. The actuator 208 is used to magnetically attract both beams to simultaneously drive them about their separate axes until they meet lower adjustable stops 212 of which only the lower adjustable input stop is shown. The stops, one for each beam, which are preferably screws with locknuts are located iiear the end of each beam opposite their pivots.

Since the beams rotate about separate axes of pins 217 and 219, it is possible to set the upper and lower adjustable stops 210, 211 and 212 in such a way as to align two pairs of individual fibers. One pair of fibers is aligned when the beams are in their rest position against stops 210 and 211. When electrical power is applied, the electromagnetic actuator 208 simultaneously urges both of the beams 206 and 204 down until they come in contact with their respective lower adjustable stops 212. At that point, either the original input fiber is aligned with a new output fiber to form a 1×2 switch or if manufactured in such form, two different fibers are aligned to form the second of two 1×1 (on-off) switches.

SUMMARY

Accordingly, it can be seen that the optical switch of the present invention provides a compact device easily constructed of relatively inexpensive components which displays superior optical performance that is stable and consistent over time and environmental fluctuations. The geometry of the switch is adaptable to meet a wide variety of design objectives.

While the above description contains many specificities, these should not be construed as limitations on the scope of the invention, but rather as an exemplificaticn of some of the presently preferred embodiments thereof. For example, the motion of the beams may be provided by many other means, including but not limited to linear or voice coil actuators, cams, tension wires, manual manipulation etc.; the optic fibers may be replaced by any of a number of alternative optical waveguides including silicon, lenses, etc.; and the beams may be constructed of alternative materials such as silicon or replaced by more complex structures which vary in shape or support means and yet serve the same kinematic purpose as the beams described herein.

Although the present invention has been described with reference to preferred embodiments, workers skilled in the art will recognize that changes may be made in form and detail without departing from the spirit and scope of the invention.

What is claimed is:

1. An optical switch comprising:
   a base;
   first and second members mounted on the base;
   at least one first optical waveguide mounted to said first member with said first optical waveguide terminating at first optical end surface;
   at least one second optical waveguide mounted to said second member with said second optical waveguide terminating at second optical end surface;

said first and second members being positioned so that said first optical end surface is in opposing relationship with said second optical end surface, the first optical end surface tracing a first path lying in a first plane upon movement of the first member, said second optical end surface tracing a second path lying in a second plane upon movement of said second member, said first and second planes being substantially parallel and said first and second paths being substantially non-parallel and overlapping in at least part of the paths; and a controllable drive for moving said first and second members to move the first and second endfaces in their paths so as to selectively optically align at least one first optical end surface with at least one second optical end surface in the part of the respective paths that overlap.

2. The optical switch as in claim 1, wherein said first and second optical waveguides are optical fibers.

3. The optical switch as in claim 1, wherein said first and second members are beams supported on the base so that portions are movable.

4. The optical switch of claim 3, wherein the beams are mounted on the base for movement about pivot axes.

5. The optical switch as in claim 1, wherein said first and second paths form arcs.

6. The optical switch as in claim 4, wherein said drive moving said first and second members moves the members at pivot axes such that the drive movement is deamplified at said first and second optical end surfaces.

7. An optical attenuator comprising:

a first and a second movable member;

at least one first optical waveguide mounted to said first member with said first optical waveguide terminating at a first optical end surface;

at least one second optical waveguide mounted to said second member with said second optical waveguide terminating at a second optical end surface;

said first and second members being mounted relative to each other such that said first optical end surface is in opposing facing relationship with said second optical end surface, movement of said first optical end surface tracing a first path lying in a first plane, movement of said second optical end surface tracing a second path lying in a second plane, said first and second planes being substantially parallel and said first and second paths being non-parallel and at least partially overlapping; and a controllable drive for moving said first and second members so as to selectively optically misalign and align said at least one first waveguide with said at least one second waveguide.

8. The optical attenuator as in claim 7, wherein said first and second optical waveguides are optical fibers.

9. The optical attenuator as in claim 7, wherein said first and second members are beams pivotally mounted relative to a base.

10. The optical attenuator as in claim 7, wherein said first and second paths are arcs.

11. The optical attenuator as in claim 7, wherein said controllable drive moves portions of said first and second members a known distance and said first and second optical end surfaces move a lesser distance.

12. The optical attenuator of claim 7, wherein the first and second movable members comprise elongated beams pivotally mounted adjacent first ends thereof relative to a support, the controllable drive operating to move said beams at a position spaced a first distance from the pivotal mounting of each of the beams, and the at least one first and at least one second optical waveguides being mounted on the respective beams such that movement thereof is less than the first distance.

13. The optical attenuator of claim 7, wherein there are a plurality of first optical waveguides mounted in a first ferrule, and a plurality of second optical waveguides mounted in a second ferrule, the ferrules being mounted to the first and second members respectively and movable in a defined path such that each of the plurality of first optical waveguides can be moved to be aligned with any one of a plurality of the second optical waveguides.

14. The optical attenuator of claim 13, wherein the controllable drive comprises separate drives for said first and second members, each of said controllable drives being movable to known preselected positions, such that a selected one of the first optical waveguides can be aligned with a selected one of the second optical waveguides.

15. The optical attenuator of claim 14, wherein the first and second members comprise separate pivotally mounted beams, and said controllable drives for said beams comprise separate stepper motors for driving each of said beams, the stepper motors having a position identifier for each step to determine the position of the corresponding beam at such step.

16. The optical attenuator of claim 14, wherein each of said controllable drives comprises a stepper motor having an output shaft that can be positioned at a desired rotational position in response to control signals, and a gear on said output shaft engaging a gear driving the respective member to move the member and the mounted first and second optical waveguides, respectively.

17. The optical attenuator of claim 15, wherein said beams have gear racks at ends thereof spaced from the beam pivotal mounting, and said separate stepper motors for said beams having pinion gears engaging said gears on the ends of said beams to pivot the respective beam.

18. The optical attenuator of claim 9, wherein said beams are movable independently of each other with said controllable drive, and the controllable drive comprising separate screw threaded members for engaging each of the beams, separate motors for driving said separate screw threaded members, and a controller to control said motors.

19. The optical attenuator of claim 18 and a stop for stopping said beams at a known position when driven to a home position.

20. The optical attenuator of claim 13, wherein said first and second members are positioned to have portions adjacent to each other such that the optical waveguides mounted on the respective first and second members are closely adjacent and move in different arcuate paths under control of the controllable drive.

21. The optical attenuator of claim 7, wherein said controllable drive comprises a solenoid for simultaneously moving both of said first and second members to a second position from a first position.

22. The optical attenuator of claim 21, wherein said at least one first optical waveguide and said at least one second optical waveguide are aligned in the first position and are misaligned in the second position.

23. A method of controlling an optical switch including mounting at least one first optical waveguide on a first movable drive, mounting at least one second optical waveguide on a second movable drive in opposing position, the optical waveguides being mounted for movement in separate paths that at least partially overlap, and selectively optically aligning the at least one first optical waveguide with the at least one second optical waveguide in first positions and misaligning the at least one first optical waveguide and the at least one second optical waveguide in second positions.

24. The method of claim 23 including moving the at least one first optical waveguide and the at least one second optical waveguide in arcuate paths.

25. The method of claim 24 wherein the moving of the optical waveguides comprises moving arms supporting the optical waveguides by applying a force to the arms over a path of movement, and pivoting the arms about locations such that movement of the arms at the location where the force is applied results in substantially smaller movement of the waveguides.

26. A method of changing and optimizing the positions of a first waveguide array and a second waveguide array including mounting the first and second waveguide arrays for movement in paths that define arcs that at least partially overlap, the first and second waveguide arrays facing each other and each including a waveguide, moving the first and second waveguide arrays to a reference position using waveguide drives, zeroing waveguide drives at this reference position, and moving the waveguide drives to provide a maximum transmission of signals between a selected input waveguide and one output waveguide to establish a second reference position.

27. The method of claim 26 wherein the one input and one output waveguides are each at a corner of defined rectangular frames of reference of the respective waveguide arrays, and moving at least one waveguide array while sensing transmission of signals between a second input waveguide and a second output waveguide to maximize the signals transmitted between them to establish a second home position.

28. The method of claim 26 including the step of moving the waveguide arrays to obtain a maximum signal at the one output waveguide relative to the one input waveguide by moving the waveguides in a consistent direction and sequence to record positions for input waveguide relative to a selected one of the output waveguides until the maximum signal position is detected.

29. The method of claim 26 and using the threshold signal that is sensed as a maximum signal as a center point of an imaginary rectangular outline, forming the lengths of each side of the imaginary rectangular outline substantially equal to the diameter of the array for input and output optical fibers so that an input fiber coincides with the diagonal of the imaginary rectangular outline, moving the one input fiber to transverse adjacent sides of the imaginary rectangular outline, determining for each side a point of maximum signal transmission between the one input and the one output fiber, repetitively forming the lengths and moving the one input fiber using the maximum signal location for center points for new rectangular outlines with smaller size until the one input wave guide is aligned with the one output waveguide.

30. The method of claim 26 and determining the location of the input and output waveguide arrays and establishing coordinates that correspond to the position where a lighted input waveguide is aligned with a sensed output waveguide and repeating the routine until all individual input waveguides of the input waveguide array are paired with an individual output of the output waveguide array waveguide and the coordinates of such pairings relative to the reference position are determined.

* * * * *